April 7, 1964  F. TESKE  3,128,104
MAGNETIC LABYRINTH-TYPE SEAL FOR SHAFTS
Filed Dec. 15, 1961  2 Sheets-Sheet 1

INVENTOR
Fritz Teske
BY Lowry & Rinehart
ATTYS.

April 7, 1964    F. TESKE    3,128,104
MAGNETIC LABYRINTH-TYPE SEAL FOR SHAFTS
Filed Dec. 15, 1961    2 Sheets-Sheet 2
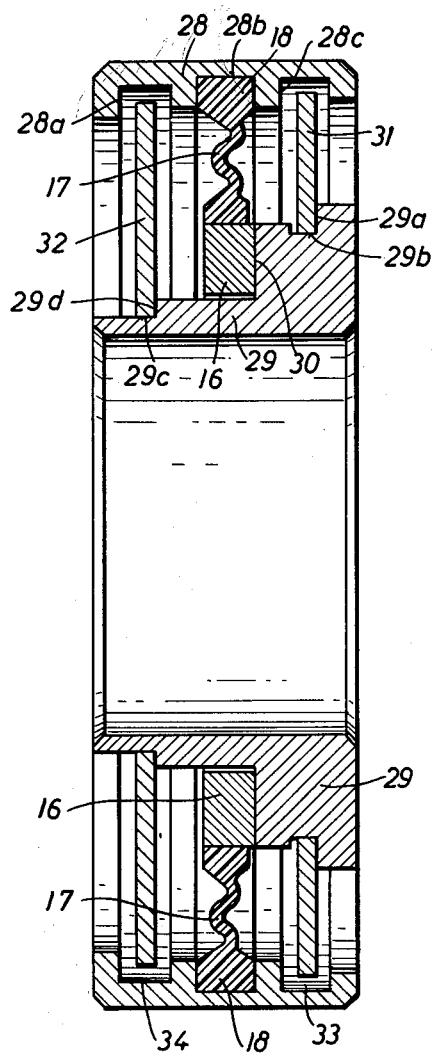
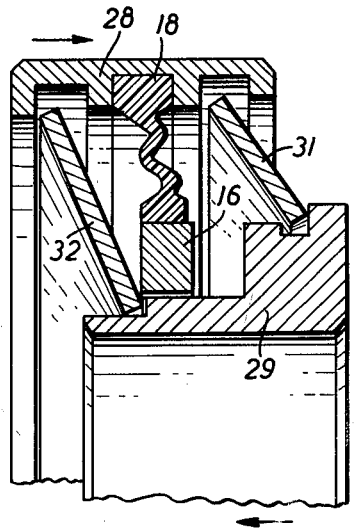
INVENTOR
Fritz Teske
BY
Lowry & Rinehart
ATTYS.

United States Patent Office 3,128,104
Patented Apr. 7, 1964

3,128,104
MAGNETIC LABYRINTH-TYPE SEAL FOR SHAFTS
Fritz Teske, Niehler-Kirschweg 139,
Cologne-Weidenpesch, Germany
Filed Dec. 15, 1961, Ser. No. 159,617
4 Claims. (Cl. 277—42)

This invention relates to a mechanical seal for relatively moving parts of machinery, particularly rotating or reciprocating parts, such as shafts, rods and the like.

Mechanical seals are already known in which the pressure between sliding contact faces is generated by magnetic forces. The construction of these seals is such that the action of the magnets for maintaining the seal is indirect. The sealing member itself is a carbon ring held in a grommet. The magnetic forces which act on the grommet pull the carbon ring against a cooperating sealing contact face. However, a carbon ring is not durable and is subject to rapid wear. There is no direct contact between the magnet and a moving part of the machine.

The present invention relates to an improved mechanical seal in which magnetic forces are used. The principal feature of the invention is that the magnet itself bears against a cooperating metallic contact face to form the seal. The magnet in the form of a ring magnet is an integral component of a seal which can be directly built into a machine, and which comprises a foot portion and a sleeve-like connecting member of flexible material. The connecting member comprises a corrugated membrane. This form of construction forms a seal in which the magnet itself directly functions as part of the seal. At the same time the seal is a compact assembly occupying minimum space, adapted to be used in shallow bearings and ready to be directly fitted where it is required. The magnet itself constitutes the lip of the sealing ring and, by being attached to the flexible corrugated membrane, it is substantially a free floating member. The magnet may be bonded by an adhesive, by vulcanization or like means to the corrugated membrane which consists of a rubber-elastic material. The corrugated flexible membrane permits the magnet to move in both the axial and radial directions, which ensures that the ring magnet which bears with a relatively large magnetic face against the metal face of a cooperating member is free to follow the movements of the part of the machine that is to be sealed and keeps parallel with the cooperating face in all circumstances. It has been found that friction between the ring magnet and the cooperating preferably ground metal face is practically non-existent. On the other hand, a reliable seal is formed which cannot be penetrated by dust and the like. The sliding contact face of the ring magnet and the cooperating face are preferably flat. Nevertheless these faces may also be shaped, for instance, convexly crowned or forming parts of a spherical surface and so forth.

According to another feature of the invention, the proposed magnetic mechanical seal comprises an inner and an outer ring for forming a housing. The component comprising the ring magnet, the membrane and the foot is connected with one of the rings, the member which cooperates with the ring magnet being connected with the other. The rings of the housing and the ring magnet device form a seal which is ready for installation. This seal may be provided with a labyrinth sealing device alongside the component comprising ring magnet and member. The entire combination may be contrived to form a seal which is ready for installation. The labyrinth seal protects the magnetic seal from damage and other undesirable external influences. Labyrinth seals provided on each side of the magnetic seal function as supplementary seals which prevent major particles of dust from reaching the magnetic seal which itself stops even the finest dust. The ring magnet seal can therefore be used for sealing parts of machinery exposed to highly contaminating working conditions. Another advantage of the ring magnet seal is that the magnet retains metal particles which may be contained in the lubricant because of abrasion in bearings and so forth, thus preventing such particles from coming into repeated contact with such bearings. The proposed seal therefore automatically keeps the lubricant clean from metal contamination by virtue of the action of the ring magnet.

The mechanical seal proposed by the invention, comprising the labyrinth seals, may be constructed in various ways. The radial face which cooperates with the ring magnet may be directly formed on one of the metal rings of the housing. Alternatively a special metal disc may be provided and located in a housing made of a non-metallic material, such as a plastic material. This metal disc may be used to form a ring for the creation of a labyrinth seal. Moreover, the rings of the housing may be divided and adapted to be assembled by being axially pushed together. The outer ring of the housing may consist of semi-circular ring portions held inside an embracing annular sleeve. This applies especially to forms of construction in which the seal is made of a plastic material. If the rings of the housing are of metal, then the discs for forming the labyrinth seals may preferably consist of a non-ferrous material, such as brass or the like.

The invention will now be described with reference to the accompanying drawings which illustrate preferred embodiments thereof and in which:

FIG. 4 illustrates another embodiment of a mechanical seal with a magnet ring and metal housing rings shown in section, and FIG. 5 is a fragmentary section of the embodiment according to FIG. 4 shown during assembly of the housing rings.

Figure 1:
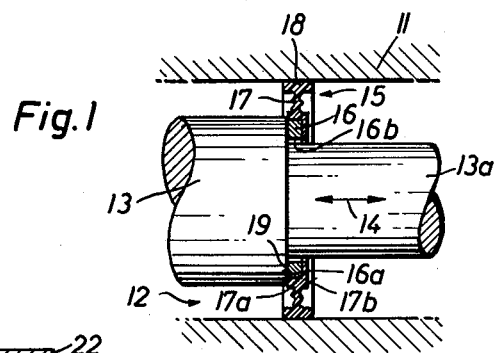
FIG. 1 illustrates a mechanical seal for a rotating and/or axially sliding shaft.

In the embodiment illustrated in FIG. 1 a rod or shaft 13 which rotates and which may also perform short axial reciprocatory movements as indicated by arrow 14 passes through a bore 12 in a member 11 of a machine. A mechanical seal 15 is provided between shaft 13 and member 11 comprising a ring magnet 16 which forms the sealing member proper, is adhesively bonded to a flexible corrugated membrane 17 formed with a solid foot portion 18. The corrugated membrane 17 may comprise an axial portion 17$^a$ and a radial portion 17$^b$, both portions being firmly bonded to the ring magnet 16 and enclosing two sides thereof.

The ring magnet 16 has a radial sliding contact face 16$^a$ which in the illustrated embodiment cooperates directly with a collar or shoulder 19 on the movable shaft or member 13. A slight clearance 16$^b$ is left between ring magnet 16 and portion 13$^a$ of the shaft. The foot portion 18 which consists of an elastic rubber material, as does the member 17 itself, is suitably sized so as to be a tight fit in bore 12 of member 11 of the machine.

In some cases this foot portion may likewise be a magnet. Conveniently the magnet is a permanent magnet. The magnetic sealing ring illustrated which is ready for immediate installation may also be contrived to serve as an external seal. In such a case, the ring magnet would cooperate with a radial face on the outer member of the machine, whereas the foot portion would be tightly held on the shaft or the like.

Figure 2:
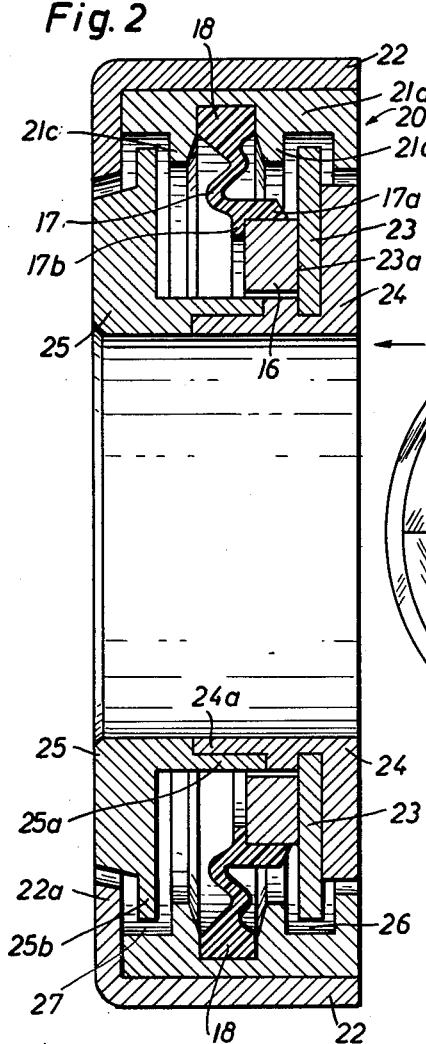
FIG. 2 illustrates a magnetic mechanical seal with housing rings shown in cross-section.
Figure 3:
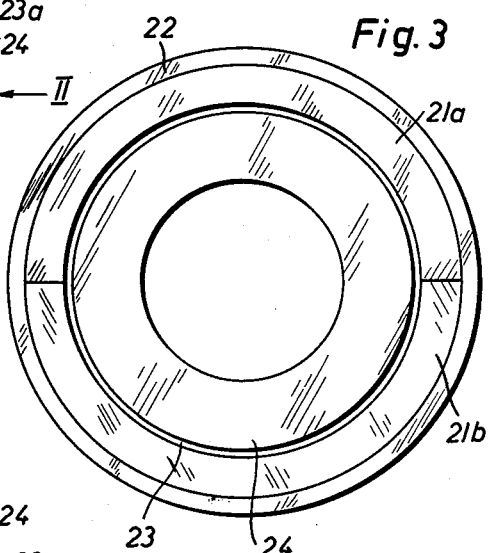
FIG. 3 is a view of the mechanical seal shown in FIG. 2 in the direction of arrow II but drawn to a smaller scale.

The embodiment illustrated in FIGS. 2 and 3 comprises a sealing ring together with part of a housing or housing rings which are conveniently made of a non-metallic material such as a plastic material, the whole being ready for installation. The foot portion 18 of a magnetic seal 16, 17, 18 is held in an external annular housing 20 consisting of two half rings 21$^a$ and 21$^b$ embraced by a closed sleeve 22. The foot portion 18 is held between shoulders 21$^c$ and 21$^d$ or rings 21$^a$ and 21$^b$ of the housing. The ring magnet 16 slidably cooperates with a steel disc 23 having a mirror ground face 23$^a$. The cooperating contact faces of the permanent magnet 16 and of the steel disc 23 form a mechanically durable seal, the pressure for ensuring the tightness of the seal being generated by the permanent magnet 16. The provision of the corrugated membrane 17 which is both radially and axially flexible permits the full magnetic power of the ring magnet 16 to be utilized for the generation of sealing pressure against the steel disc 23. The inner annulus of the housing comprises rings 24 and 25 with axial portions 24$^a$ and 25$^a$ which interengage. If the plastic material is used for the housing, the bright steel disc 23 which has the mirror ground face 23$^a$ can be directly bedded into ring 24 when the latter is injection-moulded. The two parts 23 and 24 thus form a single component. The outer rings 21$^a$ and 21$^b$ of the housing are formed preferably with annular grooves 26 and 27 into which disc 23 and a flange-like extension 25$^b$ of ring 25 of the housing project to form labyrinth seals. One side of the encircling sleeve 22 of the housing is formed with a flange 22$^a$.

The several components of the magnetic mechanical seal shown in FIGS. 2 and 3 are conveniently assembled by first fitting a half ring 21$^a$ into ring 24 containing disc 23. The ring magnet seal together with membrane 17 and foot 18 are then inserted into the groove provided for their reception and at the same time the ring magnet 16 is placed against disc 23. The second half ring 21$^b$ is then placed over ring 24 and membrane 17 together with its foot 18 are likewise pressed into the groove between the two shoulders 21$^c$ and 21$^d$. The inner ring 25 of the housing is then fitted onto ring 24 and the embracing sleeve 22 is finally pushed over the two half rings 21$^a$ and 21$^b$. If the housing parts are made of a plastic material they can be bonded together by a suitable adhesive solution. The resultant assembly is a mechanical seal which is ready for installation, the ring magnet seal 16, 17, 18 being contained between the labyrinth seals formed by disc 23 and groove 26 and flange 25$^b$ and groove 27 on each side. The complete assembly can then be inserted into the bore of part of a machine for protecting a ball-bearing or the like, rings 24 and 25 being fitted onto a shaft or the like.

In the embodiment illustrated in FIGS. 4 and 5 the outer ring 28 and the inner ring 29 of the housing are undivided complete rings. At least the inner ring 29 is made of steel. Steel may also be used as the material for making the outer ring 28 of the housing. The ring magnet 16 slidably cooperates with the sealing face 30 of the inner ring 29, which may be ground. For creating a supplementary labyrinth seal, discs 31 and 32 are provided. These preferably consist of brass because this is not magnetically permeable and therefore does not interfere with the magnetic field of the ring magnet. The two discs 31 and 32 project into circular grooves 33 and 34.

The housing members of the complete ring magnet seal and the discs for forming the lateral labyrinth seals are conveniently assembled by deforming the two discs into the shape of cones 31 and 32 prior to assembly. This can be done by pushing the inner edge of the disc in relation to the outer edge of the disc in the axial direction of the central hole. The deformed disc will then have the shape of a truncated cone as shown in FIG. 5. The deformation reduces the external diameter of the disc and increases its internal diameter.

Using annular discs 31 and 32 which have thus been deformed, the deformed cone-shaped disc 31 is pushed over the inner ring 29 of the housing until the minor diameter of the disc snaps into contact with face 29$^a$. The similarly deformed annular disc 32 is then inserted into the external ring 28 of the housing until its major diameter snaps into contact with face 28$^a$. Moreover, the foot 18 of the ring magnet seal is inserted into the cooperating groove 28$^b$ in the outer ring 28 of the housing, the ring magnet 16 being firmly bonded to the corrugated membrane 17. Finally, the outer ring 28 of the housing containing the magnetic seal 16, 17, 18 together with the deformed disc 32 is forced over the inner ring 29 of the housing. The outer edge of the deformed disc 31 will therefore now make contact with face 28$^c$ and the other deformed ring 31 will make contact with 29$^c$. Further axial pressure on the housing will finally bring the outer ring 28 into radial alignment with the inner ring 29, that is to say, the rings will be forced from the position shown in FIG. 5 into that shown in FIG. 4. The deformed rings 31 and 32 are straightened again by this process and, owing to the consequent reduction of their minor diameters, they will firmly apply themselves to faces 29$^b$ and 29$^c$ of the inner ring 29 of the housing. In other words, the two discs 31 and 32 are again flattened and their outer peripheries engage the two grooves 33 and 34, respectively. The resultant assembled mechanical seal is ready for installation, the ring magnet seal being contained between a labyrinth seal on each side. If desired, more than one labyrinth seal may be provided on each side.

Before they are assembled all the parts can be greased, thus giving rise to the creation of a grease pad between discs 31 and 32 and membrane 17 with a consequent additional sealing effect.

While there are herein shown and described the preferred embodiments of the invention, it is nevertheless to be understood that minor changes may be made therein without departing from the spirit and scope of the invention as claimed.

What is claimed as new is:

1. A unitary shaft seal comprising, in combination, inner and outer annular housing rings, at least one of said rings having a pair of axially spaced annular grooves therein, disc members associated with the other of said rings extending into said grooves to form longitudinally spaced labyrinth seals, means defining a chamber between said disc members, a permanent ring magnet having a radial mirror ground surface in said chamber, a cooperating magnetic radial mirror ground surface associated with said other ring slidably abutting the radial mirror ground surface of said ring magnet to form a seal, and a flexible corrugated membrane in said chamber sealingly connected between said ring magnet and said one housing ring.

2. The structure of claim 1 wherein said housing rings are comprised of non-magnetic material and said disc members are comprised of magnetic material, said cooperating radial mirror ground surface being formed on one of said disc members.

3. The structure of claim 1 wherein said housing rings are formed of magnetic material and said cooperating radial mirror ground surface is formed on said other housing ring.

4. A mechanical seal as in claim 1, wherein the outer housing ring is surrounded by a closed annular sleeve.

References Cited in the file of this patent

UNITED STATES PATENTS

| | | |
|---|---|---|
| 2,554,488 | Carr | May 29, 1951 |
| 2,685,463 | Pollard | Aug. 3, 1954 |
| 2,843,403 | Stevenson | July 15, 1958 |
| 2,883,212 | Laser | Apr. 21, 1959 |
| 3,050,319 | Colby | Aug. 21, 1962 |

FOREIGN PATENTS

| | | |
|---|---|---|
| 631,981 | Great Britain | Nov. 14, 1949 |